United States Patent [19]
de Bruijne et al.

[11] Patent Number: 5,447,738
[45] Date of Patent: Sep. 5, 1995

[54] DEEP-FROZEN, PRE-PROOFED DOUGHS

[75] Inventors: Dirk W. de Bruijne; Marjolein L. Hagemans; Paul Jager, all of Vlaardingen; Johannes de Looff, Rhoon; Johannes C. Sanders, Vlaardingen, all of Netherlands

[73] Assignee: Van den Bergh Foods Co., Division of Conopco, Inc., Lisle, Ill.

[21] Appl. No.: 59,692

[22] Filed: May 10, 1993

[30] Foreign Application Priority Data

May 11, 1992 [EP] European Pat. Off. ............ 92201329
Jun. 24, 1992 [EP] European Pat. Off. ............ 92201872

[51] Int. Cl.$^6$ ............................................. A21D 2/36
[52] U.S. Cl. ....................................... 426/549; 426/62; 426/556; 426/573; 426/576
[58] Field of Search ............... 426/573, 549, 576, 556, 426/62

[56] References Cited

U.S. PATENT DOCUMENTS

| | | |
|---|---|---|
| 3,547,659 | 12/1970 | Cort . |
| 4,130,555 | 12/1978 | Ohtsuka et al. . |
| 4,324,811 | 4/1982 | Eugley . |
| 4,406,911 | 9/1983 | Larson et al. . |
| 4,450,177 | 5/1984 | Larson et al. . |
| 4,451,491 | 5/1984 | Trop et al. . |
| 4,503,083 | 3/1985 | Glicksman et al. . |
| 4,861,604 | 8/1989 | Tang et al. . |
| 5,130,158 | 7/1992 | Otsubo et al. ..................... 426/573 |
| 5,254,351 | 10/1993 | de Boer et al. ..................... 426/549 |

FOREIGN PATENT DOCUMENTS 285196 10/1988 European Pat. Off. .

OTHER PUBLICATIONS

European Search Report in a corresponding European Patent Application No. 92201872.6.
International Search Report in a corresponding International Patent Application No. PCT/EP 93/01076.
Derwent Abstract of JP 02 177 848.
Derwent Abstract of JP 60/160 833.
Derwent Abstract of SU 1 128 888.
Derwent Abstract of JP 0126771.
Derwent Abstract of ZA 8100756.
Derwent Abstract of ES 2006416.
Derwent Abstract of NL 7306690.
Derwent Abstract of SU 267539.
Derwent Abstract of JP 88007739.
Derwent Abstract of SU 999993.
Derwent Abstract of SU 1140455.

*Primary Examiner*—Helen Pratt
*Attorney, Agent, or Firm*—Rimma Mitelman

[57] ABSTRACT

The invention concerns pre-proofed, frozen dough that display excellent ovenspring properties upon baking. Herefore, an additive is incorporated in the dough that imparts to a fresh dough specific properties, defined as increase in tan delta at 32° C. and decrease in elastic modulus G' at 80° C.

5 Claims, 1 Drawing Sheet

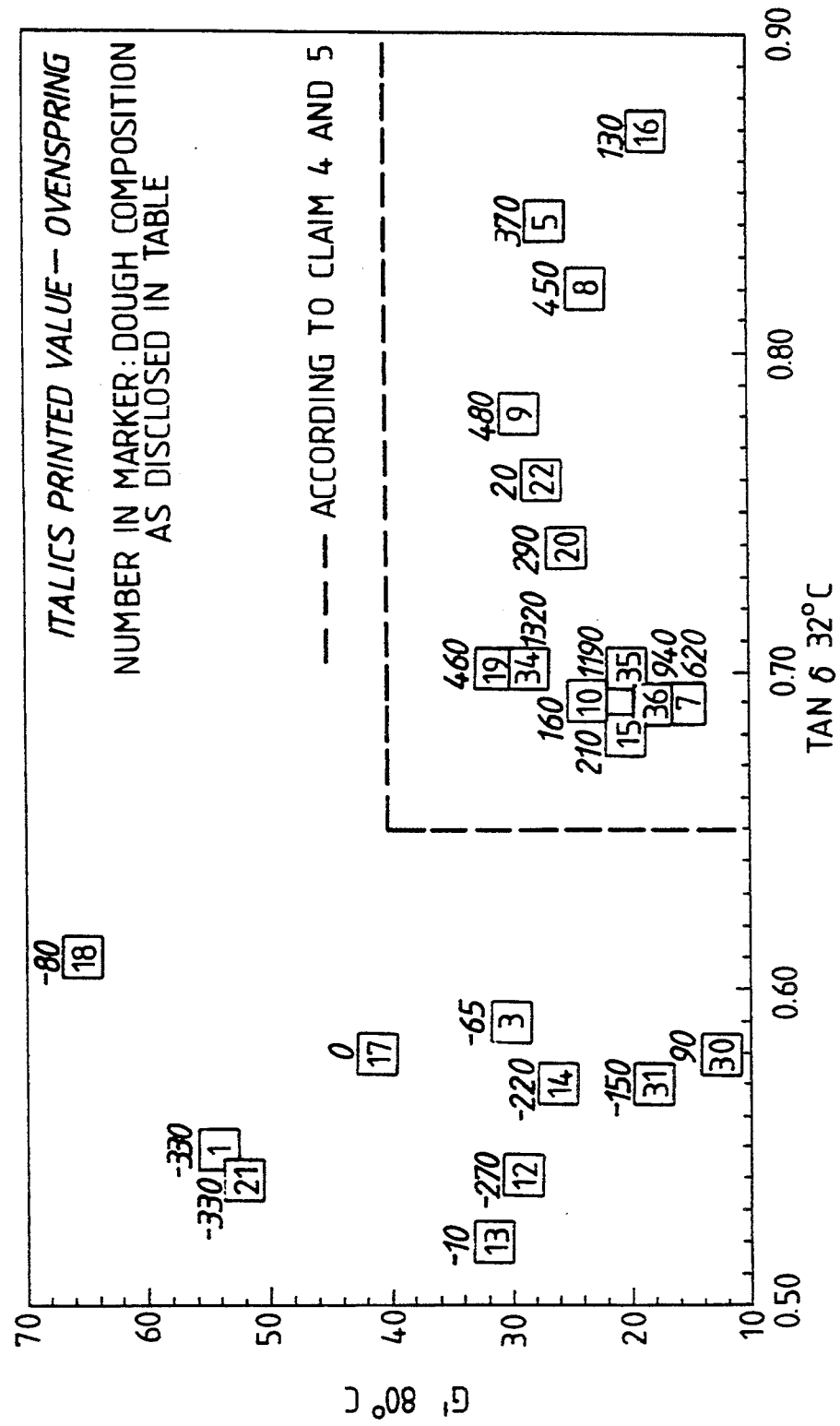

DEEP-FROZEN, PRE-PROOFED DOUGHS

The preparation of a dough, involving mixing of the components, partial pre-proofing step(s), resting step(s), moulding steps and full-proofing steps, after which the moulded products have to be baked immediately, is a time-consuming process for bakers. Accordingly, many attempts have been made to develop processes and/or doughs that can be carried out or prepared on one particular day, whereupon the dough is frozen and whereafter the baking can be carried out at the moment that suits the baker best. However, these attempts have not been very successful so far because the specific volume and ovenspring of the products that could be prepared were far less than those prepared from the non-frozen doughs. And consequently, the eating properties were not optimal.

In U.S. Pat. No. 4,406,911 (equivalent with EP 114 450) frozen, lean-bread doughs are disclosed that are prepared from doughs containing the normal ingredients needed for preparing doughs (water, flour and yeast) and wherein in addition to a gum and a surfactant also an amount of a film-forming protein is present. The film-forming proteins mentioned are vital gluten, egg albumin, beef albumin, selected legume protein isolates, milk proteins, soya milk legume protein isolates, cereal grain protein isolates, while in the Examples only the use of egg proteins is illustrated. Examples of gums that could applied are xanthan, tragacanth, guar, carrageenan, CMC. In order to obtain the desired dough, it is necessary to perform a very specific process for preparing the doughs, wherein the specific volume of the dough before freezing must be kept below 3.08 ml/g.

A similar process and dough are mentioned in U.S. Pat. No. 4,450,177. In literature there are many references about the use of gelatin in food products. In JP 02 177 848 the use of gelatin in pie products is described. In JP 01262771 it is disclosed that gelatin can be used in desserts, leading to a product having a reduced calorific content. According to U.S. Pat. No. 4,861,604 a dough filling can be made that contains gelatin. Frozen fritters containing gelatin are the subject of ES 2 006 416. In EP 285 196 Unilever has disclosed the use of gelatin in croutons.

Some applications of gelatin in doughs can also be found in literature. JP 60 160 833, for example, discloses bread doughs with improved staling properties that contain a) a gummy substance, b) starchy material and c) protein, e.g. gelatin. In U.S. Pat. No. 4,451,491 wheat-free bread mixes are described, comprising non-wheat starch, a gluten substitute gum and an emulsified fat. In this mix, gelatin can also be incorporated as binding agent. In U.S. Pat. No. 4,324,811 dough-like products are described, containing a protein material, gelatin, a polyphosphate, a gum, a whipping aid and balance a starch material.

From JP 88,007,739: U.S. Pat. No. 3,547,659 and U.S. Pat. No. 4,130,555 it is known to use hydrolysed gelatin in bread doughs. The gelatin product is added because of its water- or moisture retaining properties, or to impart flavour and aroma to bread or biscuits.

RD 286,046 discloses the use of pectin in yeast-leavened baked goods which are frozen after baking. Reheating of the baked product in a microwave oven leads to products which are less tough and gummy.

Further it is known from literature how to apply pectin in bakery products, such as bread doughs (cf. SU 1,140,455; SU 1,128,888; U.S. Pat. No. 4,503,083; ZA 8100756; NL 7306690; SU 267,539 and SU 999,993). However, this prior art does not disclose the criteria that should be fulfilled by the additives in order to make them suitable to be applied in deep-frozen, pre-proofed doughs that can be baked directly from the freezer without thawing being needed.

We have found, which criteria should be met by the additive or mixture of additives to enable its use in deep-frozen, pre-proofed doughs in order to obtain products with excellent specific volumes and ovenspring properties. Moreover, it was found that the storage stability of these products was surprisingly good.

BRIEF DESCRIPTION OF THE DRAWING

FIG. 1 illustrates the relation between G' (80° C.) and Tan $\delta$ (32° C.) for the different dough-systems (i.e., doughs 1–36 in the Examples). Those doughs have a different rheology, resulting from the use of different dough improver ingredients as indicated in the Table summarizing the Examples. In the drawing, the dough numbers corresponding to those in the Table, are indicated in the markers while the ovenspring for each dough-number is mentioned in the drawing by values printed in italic. The dough-compositions within the square indicated with the broken-lines have a rheology according to our invention and also have a positive ovenspring. The doughs outside this square have a rheology not according to our invention.

Our invention therefore relates to deep-frozen, pre-proofed doughs, in particular lean doughs having less than 10 wt. %, based on the flour, of fat, which comprise the conventional dough-forming ingredients, i.e. at least flour, water and yeast and at least an effective amount of one or more dough improver ingredients, wherein the ingredient(s) is (are) selected from that group of ingredients, which impart to a fresh dough, made from Columbus$^R$ flour an increase in tan delta, with respect to a dough without the ingredient of 15–60% and a decrease in G' at 80° C., with respect to a dough without the ingredient of 30–80%.

Although ingredients that can be used in our invention, such as xanthan gum, guar gum, CMC etc. are mentioned in EP 114 450 these ingredients were never applied in such quantities or in such combinations that a dough was obtained that met the rheological requirements for our doughs. This is illustrated in the attached table, wherein dough numbers 30 and 31 illustrate the rheology of a dough with the composition, according to examples 3 and 4 of EP 114 450. As illustrated in the attached graph of G'$_{80}$ against tan delta at 32° C. the rheology of the dough according to these examples (=our dough numbers 30 and 31) is outside the graph, accounting for our doughs. Therefore, our invention is novel over the teaching of this EP 114 450 and could not be derived from this reference either. In fact, we have found that the required rheology can only be achieved by applying appropriate amounts of our additives, specifically by applying appropriate amounts of specific combinations of our additives, while also the type of flour applied has an impact on %he rheology of the dough (compare e.g. dough numbers 10, 20 and 22).

The specific volume and in particular the ovenspring of products, in particular buns, which are obtained after baking of deep-frozen, moulded pieces of pre-proofed dough containing an additive according the invention, exhibit a behaviour that is close to the behaviour of products made from fresh doughs.

The deep-frozen, pre-proofed, moulded dough products can be baked directly in an oven without thawing and/or further proofing. This means that the time-consuming process of the past for making and baking the end products can be avoided now, while the results are approximately the same as in the case of non-frozen doughs.

Definitions for the elastic modulus G' and tan delta can be found in J. D. Ferry, Viscoelastic Properties of Polymers, 2nd ed. (1970).

G' (elastic modulus) and G" (loss modulus) were measured by using the Rheolab UM/MC-20 rheometer (ex. Physica). The elastic modulus and the phase angle (delta) were used to characterize the doughs. The phase angle is defined as tan delta=G"/G'. In these experiments a Columbus$^R$ flour was used with the following characteristics:

% protein: 15
$H_2O$: 14.3
ash-content: 0.53%
falling no.: 289

Twenty grams of dough were placed in a grooved concentric cylinder geometry (MS-Z3 to DIN 53019) with a radius of the inner cylinder of 1.25 cm and the of the outer 1.356 cm. The height of the cylinder is 3.75 cm with a measuring cone angle of 120°.

When the dough was placed in the outer cylinder, the inner cylinder is moved downwards slowly to the right position. A thin layer of paraffin oil is placed on top of the sample to prevent evaporation.

The outer cylinder is kept at 28° C. (kneading temperature) by a Viscotherm VT-100 thermostatted bath. A relative deformation of $\gamma=0.02$ was applied to the sample and the dynamic moduli G' and G" were measured as a function of time at an angular frequency of $\omega=1$ rad.s$^{-1}$. After 10 minutes the temperature is brought to 32° C. to simulate the dough during proofing. The dough remains for about 60 minutes at that temperature to mimic actual proofing. Thereafter the temperature is increased from 32° to 98° C. in 2400 seconds and now the moduli are measured as a function of temperature at $\gamma=0.02$ and $\omega=1$ rad.s$^{-1}$. Although we use G' and tan delta in order to identify the additives that are suitable, it is also possible to use rheological parameters obtained from creep-experiments.

Specific volumes and ovensprings were measured using the following test-procedure:

The improving ingredient used is preferably dissolved in water. The solution with the improving ingredient is heated to at least 50° C. to ensure complete solvation of the ingredient.

Water addition is adapted to the level of 500 BU (Brabender units) using a farinograph ex Brabender, for the dough with improving ingredient. Water addition is corrected for the water used to solubilize the improving ingredient used. Water is added to the flour, yeast, salt and the solution with the improving ingredient and slowly mixed with an Eberhardt kneader (Minimat) for three minutes and then mixed fast for the remaining time with an Eberhardt to obtain an optimally developed dough. The kneading time to obtain an optimally developed dough depends on the improving ingredient used and is determined by the maximum in the farinograph (Brabender) curve (the kneading at speed 2 in the Eberhardt is the maximum dough development time in the farinograph minus 1.5 min). The dough temperature after kneading should preferably be 28° C.

The dough is proofed for 20 minutes at 30° C., and subsequently moulded in 50 g rolls. These rolls are proofed for 60 minutes at 32° C. with RH of 70-85% in a Koma proofing cabinet. After proofing the doughs are quickly frozen at $-35$° C. for one hour. Storage for one week is at $-20$° C. The rolls are directly baked from the freezer in an Probat oven at 220° C. for 24 minutes. The specific volumes (SV in ml/g) of the products are measured. Ovensprings were calculated (see also ICC-115).

The doughs according to the invention can also be shaped as a laminated dough wherein the different dough layers are separated by fat layers.

In fact, deep-frozen, pre-proofed doughs are aimed at which, in addition to the conventional dough-forming ingredients, also contain 0.0005-10 wt. % preferably 0.5-7.5 wt %, in particular 1-5 wt. % of the additive so that, after baking, a moulded piece of dough gives a baked product with a positive ovenspring, preferably an ovenspring of at least 2.0, more preferably 3.0-5.0 ml/g. Amounts of additives are based on the flour component of the dough.

Another aim is to provide a deep-frozen, pre-proofed dough that imparts a specific volume of at least 4.2 ml/g to a baked product after the baking of a moulded piece of dough.

Additives, if applied in levels of 1-5 wt. % that impart the required decrease in G' and increase in tan delta to a fresh dough made from Columbus flour are: gelatin, pectin, guar gum, carboxymethylcellulose, methocel ® (=methyl cellulose from Dow), caseinates and mixtures hereof. Very suitable combinations are e.g. gelatin and CMC; gelatin and Nacaseinate; methocel and sodium caseinate; or guar and Nacaseinate and CMC.

As the use of gelatin is subject of U.S. Pat. No. 5,254,351 and the use of pectin is the subject of our co-pending patent application WO 9322928 these additives are excluded from the scope of our claims.

In addition to or instead of the additives mentioned above, the doughs can also contain one or more ingredients chosen from the group consisting of ascorbic acid, vital gluten, glucose oxidase, xylanase, amylase and DATA esters. In particular, combinations with xylanase and/or amylase leads to unexpectedly good results. In fact, some synergism occurs when the additive is used in combination with xylanase and/or amylase.

Effective amounts of these other additives vary from 0.0005-1.5 wt. % for xylanase, glucose oxidase and/or amylase and/or DATA esters to 1-5 wt. % for the vital gluten, while ascorbic acid is used in amounts of 0.005-0.03 wt. %. The actual amount of enzyme that will be used, depends on the activity of the enzyme. However, also emulsifiers and bakery fats can be applied.

Deep-frozen, pre-proofed doughs that are particularly preferred contain 3-7 wt. % of additive, 3-5 wt. % of vital gluten, 0.03-0.06 wt. % of xylanase and/or amylase and 0.3-0.7 wt. % of DATA esters.

We have found that the best results are obtained, when the additive imparts to a fresh dough an elastic modulus G' of 10-40 k.Pa at 80° C. and simultaneously a tan delta of 0.65-0.90 at 32° C.

Laminated products in the form of laminated, pre-proofed frozen doughs comprising the dough according to the invention are also part of the invention.

The baked products obtainable after baking of the moulded pieces of dough with the composition according to the invention are also part of the invention. These products comprise in particular buns, Danish pastries, croissants and baguettes.

The process applied for the preparation of the doughs, comprises:

a step wherein at least one partial pre-proofing for at least 5 minutes is performed.

After the partial pre-proofing, resting steps can be carried out but these steps can also be omitted.

In the following step of the process, the dough is proofed completely, preferably below 35° C., for 30–90 minutes. The fully proofed dough is frozen by cooling to −10° C. or below, in particular to −10° to −35° C. The deep-frozen, pre-proofed dough can be stored at temperatures from −5° to −35° C.

The moulding of the dough is usually carried out after at least one partial pre-proofing step has finished. If laminated doughs are prepared, the lamination is preferably carried out with the dough obtained after kneading and one or more resting step(s).

The baking of the moulded, deep-frozen, pre-proofed dough is performed by transferring the moulded dough directly from the freezer to the oven and baking the product at 180°–240° C. for 15–60 minutes.

The specific volumes of the baked products and of the frozen doughs are measured according to the seed displacement method. Measurements of the baked products were performed on products that were cooled for 60 minutes at ambient temperature.

The ovenspring is calculated as the difference in specific volumes of the products after baking and before baking.

EXAMPLES

The following recipe was used in all the Examples:

|  | Baker % |
|---|---|
| Flour (see table) | 100 |
| Salt | 2 |
| Yeast (Koningsgist) | 5 |
| Additive | see table |
| Water | see table |

The ingredients were kneaded at a temperature below 27° C. After kneading, pre-proofing was carried out for 15 minutes at 30° C. The pre-proofed dough was moulded in pieces of 50 g. The moulded dough was subjected to a second proofing for 60 minutes at 32° C. and 85% RH.

In the direct baking experiments, the pieces of dough were directly baked at 230° C. for 18 minutes, using a Probat oven.

In concurrent experiments, the pieces of dough were frozen at −35° C. for 60 minutes in a Koma blast-freezer. The frozen pieces were stored for 1 week at −20° C. The stored pieces of dough were baked directly from the freezer at 220° C. for 20 minutes in the Probat oven.

S.V. values were measured 60 minutes after cooling of the baked buns, using the seed displacement method.

The results are given in the following attached Table and represented in the drawing of the graph of $G'_{80}$ against tan delta at 32° C.

| DOUGH NUMBER | % WATER | FLOUR | 0.05% XYLA-NASE/AMYLASE | 0.025% XYLANASE 0.013% a-AMYLASE | 4% GLUTEN | ADDITIVE 1 | ADDITIVE 2 | OVEN-SPRING Vol/ml 6 buns | Tan delta 32° C. | G' kPa 80° C. |
|---|---|---|---|---|---|---|---|---|---|---|
| 1 | 58 | COLUMBUS | − | − | − | − | − | −330 | 0.55 | 54 |
| 3 | 62 | COLUMBUS | + | − | + | − | − | −65 | 0.59 | 30 |
| 5 | 68 | COLUMBUS | − | − | − | 5% GELATIN | − | 370 | 0.84 | 27 |
| 7 | 68 | COLUMBUS | + | − | + | 5% GELATIN | − | 620 | 0.69 | 15 |
| 8 | 82 | COLUMBUS | + | − | + | 5% PECTIN B | − | 450 | 0.82 | 23.5 |
| 9 | 79 | COLUMBUS | − | + | + | 5% PECTIN RVR | − | 480 | 0.78 | 29 |
| 10 | 76 | COLUMBUS | − | − | − | 3.5% CMC | − | 160 | 0.69 | 23.3 |
| 12 | 104 | COLUMBUS | − | − | − | 2.5% Xan. gum | 2.5% LBG | −270 | 0.54 | 29 |
| 13 | 62 | COLUMBUS | − | − | − | 1.5% GELATIN | 3.5% Colflo | −10 | 0.52 | 31.6 |
| 14 | 60 | COLUMBUS | − | − | − | 1.5% GELATIN | 3.5% Arabic gum | −220 | 0.57 | 26 |
| 15 | 78 | COLUMBUS | − | − | − | 1.5% GELATIN | 3.5% CMC | 210 | 0.68 | 20 |
| 16 | 84 | COLUMBUS | − | − | − | 1.5% GELATIN | 6.0% Sod. Cas. | 130 | 0.87 | 18 |
| 17 | 64 | COLUMBUS | − | − | − | 1.5% GELATIN | 0.75% Xan. gum | 0 | 0.58 | 41 |
| 18 | 52 | ZEEUWS | − | − | − | − | − | −90 | 0.61 | 65.5 |
| 19 | 63 | ZEEUWS | − | − | − | 5% GELATIN | − | 460 | 0.7 | 31 |
| 20 | 74 | ZEEUWS | − | − | − | 3.5% CMC | − | 290 | 0.74 | 25 |
| 21 | 60 | CWRS | − | − | − | − | − | −330 | 0.54 | 52 |
| 22 | 80 | CWRS | − | − | − | 3.5% CMC | − | 20 | 0.76 | 27 |
| 30 | 72 | COLUMBUS | − | − | − | Comp. → Example 3 GF *) Patent | − | 90 | 0.58 | 12 |
| 31 | 62 | COLUMBUS | − | − | − | Comp. → Example 4 GF *) Patent | − | −150 | 0.57 | 18 |
| 34 | 80 | COLUMBUS | − | + **) | − | 3.01% | − | 1320 | 0.70 | 29 |

-continued

| DOUGH NUM-BER | % WATER | FLOUR | DOUGH COMPOSITION | | | | | Baking Data OVEN-SPRING Vol/ml 6 buns | Rheological parameters | |
|---|---|---|---|---|---|---|---|---|---|---|
| | | | 0.05% XYLA-NASE/ AMYLASE | 0.025% XYLANASE 0.013% a-AMYLASE | 4% GLUTEN | ADDI-TIVE 1 | ADDI-TIVE 2 | | Tan delta 32° C. | G' kPa 80° C. |
| 35 | 91 | COLUMBUS | — | + **) | — | Meth-ocel ***) 3.01% | 4% N-Cas | 1190 | 0.70 | 20 |
| 36 | 90 | COLUMBUS | — | + ****) | — | Meth-ocel ***) 3.01% Guar ***) | 4% N-Cas + 1% CMC | 940 | 0.69 | 18 |

*) GF General Foods (European Patent Nr. 0 114 450)
**) 0.02% Xylanase + 5 ppm Fungamyl 1600 S
***) = include 0.01% Ascorbic acid
****) = exclude Amylase

| Name Ingredient in table | Ingredient trade-name | | Company |
|---|---|---|---|
| Xylanase/ Amylase | FP 5222 | | Quest Int. NL |
| Gluten | Vital gluten | | Protinax |
| Gelatin | Geltec UG 719 N | | Extraco |
| Pectin B | Pectin B | | Copenhagen Pectin |
| Pectin RVR | Pectin RVR | | Sonofi Bio Industrie |
| Sod. cas | Na-Caseinate | | DMV |
| CMC | Blanose 7HXF4 | | Aqualon |
| Xan. gum | Rhodigel 23 | | Rhone poulenc |
| LBG | Rudingom L | | Ruitenberg |
| Arabic gum | Ferwo gum | | Ferdiwo |
| Colflo | Colflo 67 | | National Starch |
| Xylanase | Awamori 240 u/mg = 100 ppm | | URL Vlaardingen |
| a-amylase | Fungamyl 180 S | | Novo Industrie |
| Methocel | Methocel K4M | | Dow Deutschland Inc. |
| Ascorbic acid | Ascorbic acid | | J. T. Baker |
| Guar | Rudincreme D | | Ruitenberg |
| Columbus | Melange | Protein: 15% | Meneba |
| Zeeuws | Dutch flour | Protein: 9% | Meneba |
| CWRS | Canadian flour | Protein 13.35% | Meneba |

We claim:

1. Pre-proofed, frozen dough comprising:
  (a) a flour; and
  (b) and at least an effective amount of a dough improver ingredient, wherein the ingredient is selected from the group consisting of guar gum, carboxymethylcellulose, methylcellulose, caseinates and mixtures thereof with a gelatin which ingredient imparts to a fresh dough, made from a flour having moisture content of about 15%, an ash content based on dry matter of about 0.56%, a protein content based on dry matter of about 15.2%, and a starch content of about 71%, an increase in Tan delta at 32° C. of 15–60% and a decrease in elastic modules G' at 80° C. of 30–80%;
  such that a dough from which the pre-proofed frozen dough is made displays $G'_{80}$ of 10–40 kPa and Tan delta at 32° C. of 0.65–0.90.

2. Pre-proofed frozen dough according to claim 1, wherein the dough improver ingredient is present in an amount of 0.0005–10 wt. %.

3. Pre-proofed, frozen dough according to claim 1, wherein the dough also contains small amounts of an ingredient selected from the group consisting of enzymes, oxidants, proteins, emulsifiers, and bakery-fats.

4. Laminated, pre-proofed, frozen dough containing products, wherein the laminates comprise a dough according to claim 1 as the dough component.

5. Baked products made by baking of a product made from a dough according to claim 1.

* * * * *